United States Patent
Rovik

(10) Patent No.: US 11,811,118 B2
(45) Date of Patent: Nov. 7, 2023

(54) SYSTEMS AND METHODS OF CAPTURING NITROGEN FROM FUEL CELL

(71) Applicant: TOYOTA MOTOR ENGINEERING & MANUFACTURING NORTH AMERICA, INC., Plano, TX (US)

(72) Inventor: Chris Lee Rovik, McKinney, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 98 days.

(21) Appl. No.: 17/586,348

(22) Filed: Jan. 27, 2022

(65) Prior Publication Data

US 2023/0238557 A1 Jul. 27, 2023

(51) Int. Cl.
H01M 8/0662 (2016.01)
H01M 8/04537 (2016.01)

(52) U.S. Cl.
CPC ..... *H01M 8/0662* (2013.01); *H01M 8/04604* (2013.01); *H01M 2250/20* (2013.01)

(58) Field of Classification Search
CPC ........... H01M 8/0662; H01M 8/04604; H01M 2250/20
See application file for complete search history.

(56) References Cited

U.S. PATENT DOCUMENTS

| 7,077,202 B2 | 7/2006 | Shaw |
| 2006/0035122 A1 | 2/2006 | Weissman |
| 2013/0101873 A1 | 4/2013 | Dionne |
| 2019/0044167 A1 | 2/2019 | Desai |

FOREIGN PATENT DOCUMENTS

| JP | H0490819 A | | 3/1992 |
| JP | 2005353303 A | * | 12/2005 |
| JP | 2005353303 A | | 12/2005 |
| JP | 2019131454 A | | 8/2019 |
| KR | 20150138916 A | | 12/2015 |

OTHER PUBLICATIONS

Machine translation of JP-2005353303-A, Numata et al. (Year: 2005).*

* cited by examiner

*Primary Examiner* — Brian R Ohara
*Assistant Examiner* — Brent C Thomas
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for capturing gas byproducts of a fuel cell system, such as nitrogen. Instead of dispelling the gas byproducts, a byproduct management system can engage in selective isolation, compression, and storage of the gas byproducts in various storage tanks. The compression and storage of the gas byproducts can be effectuated using excess energy, e.g., regenerative energy.

15 Claims, 6 Drawing Sheets

SYSTEMS AND METHODS OF CAPTURING NITROGEN FROM FUEL CELL

TECHNICAL FIELD

The present disclosure relates generally to a fuel cell system, and more particularly, to a fuel cell system from which nitrogen can be captured and stored for later use.

DESCRIPTION OF RELATED ART

Many vehicles are electric/electrified vehicles or, in other words, vehicles that have an electrified powertrain. The typical electrified vehicle has a more or less traditional drivetrain that includes one or more wheels, as well as a transmission, a differential, a drive shaft and the like, to which the wheels are mechanically connected. However, in place of an engine, the electrified vehicle includes one or more motors/motor-generators. As part of the electrified powertrain, the drivetrain is mechanically connected to the one or more motors/motor-generators. In conjunction with the drivetrain, the motors/motor-generators are operable to power the wheels using electrical energy. More and more such electrified vehicles are fuel cell vehicles (FCVs), or electrified vehicles that include one or more fuel cell stacks. In FCVs, the fuel cell stacks are operable to generate the electrical energy used by the motors/motor-generators to power the wheels.

A typical fuel cell can refer generally to a device that obtains electric energy by using hydrogen and oxygen as fuel. Since fuel cells have excellent environmental friendliness, and can realize a high level of energy efficiency, they have been actively developed as energy supply systems of the future.

BRIEF SUMMARY OF THE DISCLOSURE

In accordance with some embodiments, a fuel cell vehicle comprises a processor, and a memory unit operatively connected to the processor. The memory unit including computer code that when executed causes the processor to: determine whether a battery's state of charge (SOC) meets a maximum battery SOC threshold; in response to a determination that the battery SOC meets the maximum battery SOC threshold, capture nitrogen gas byproduct of a fuel cell stack of the fuel cell vehicle; and compress and store the nitrogen gas byproduct in a storage tank using regenerated energy in excess of the maximum battery SOC threshold.

In accordance with some embodiments, the regenerated energy in excess of the maximum battery SOC threshold comprises energy generated through regenerative braking of the fuel cell vehicle.

In accordance with some embodiments, the fuel cell vehicle further comprises a nitrogen storage tank in which the nitrogen gas byproduct is compressed and stored.

In accordance with some embodiments, the fuel cell vehicle further comprises a first valve operatively implemented between the nitrogen storage tank and a byproduct management system, the first valve operating to isolate the nitrogen storage tank from nitrogen output from the fuel cell stack.

In accordance with some embodiments, the fuel cell vehicle further comprises a second valve operatively implemented between the first valve and one or more hydrogen storage tanks, the second valve operating to isolate the one or more hydrogen storage tanks from nitrogen output from the fuel cell stack.

In accordance with some embodiments, the fuel cell vehicle further comprises a plurality of additional valves operatively implemented between the second valve and the one or more hydrogen storage tanks.

In accordance with some embodiments, the byproduct management system controls at least one of the first and second valves to isolate the nitrogen storage tank from the one or more hydrogen storage tanks upon the compressing and storing of the nitrogen gas byproduct in the nitrogen storage tank reaching a maximum capacity of the nitrogen storage tank.

In accordance with some embodiments, the byproduct management system controls at least one of the one or more additional valves to isolate the first of the one or more hydrogen storage tanks from a hydrogen supply system of the fuel cell vehicle upon emptying of a first of the one or more hydrogen storage tanks of hydrogen.

In accordance with some embodiments, the byproduct management system controls at least one of the first, second, and one or more additional valves to direct additional nitrogen gas byproduct to the first of the one or more hydrogen storage tanks.

In accordance with some embodiments, the byproduct management system controls the at least an additional one of the one or more additional valves to isolate successive hydrogen storage tanks of the one or more hydrogen storage tanks from the hydrogen supply system upon emptying a previous hydrogen storage tank of the one or more hydrogen storage tanks.

In accordance with some embodiments, the byproduct management system controls the at least one of the first, second, and one or more additional valves to direct the additional nitrogen gas byproduct to the successively isolated hydrogen storage tanks.

In accordance with some embodiments, a method comprises determining whether a battery's state of charge (SOC) meets a maximum battery SOC threshold. In response to a determination that the battery SOC meets the maximum battery SOC threshold, the method comprises capturing nitrogen gas byproduct of a fuel cell stack of the fuel cell vehicle. The method further comprises compressing and storing the nitrogen gas byproduct in a nitrogen-specific storage tank using regenerated energy in excess of the maximum battery SOC threshold.

In some embodiments, the regenerated energy in excess of the maximum battery SOC threshold comprises energy generated through regenerative braking of the fuel cell vehicle.

In some embodiments, the method further comprises controlling a set of valves to isolate the nitrogen-specific storage tank from the fuel cell outputting the nitrogen gas byproduct and from one or more hydrogen storage tanks providing hydrogen to a hydrogen supply system of the fuel cell stack upon reaching a maximum capacity of the nitrogen-specific storage tank.

In some embodiments, the method further comprises filling and isolating from the hydrogen supply system, successive ones of the one or more hydrogen tanks through controlling one or more of the set of valves.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
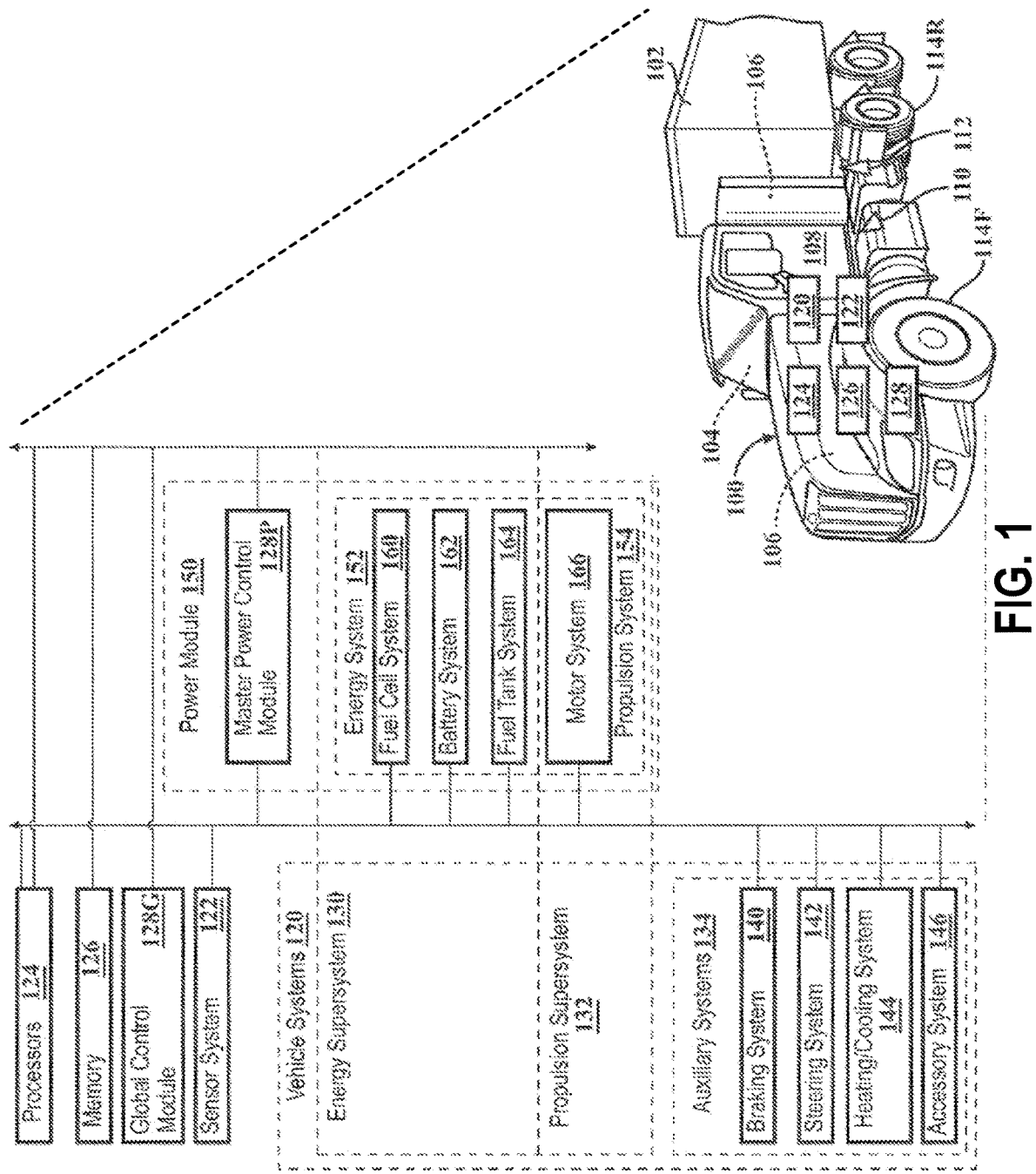
FIG. 1 illustrates an example fuel cell vehicle.

The figures are not exhaustive and do not limit the present disclosure to the precise form disclosed.

DETAILED DESCRIPTION

As alluded to above, there has been increased interest in the use of fuel cells to provide electric power for electric vehicles. Such fuel cells contain both a cathode and an anode, each of which has a gaseous flow path. A gaseous fuel, such as hydrogen, is coupled to the flow path of the anode while a reactant gas, such as air containing oxygen, flows through the cathode flow path. An electrolyte is positioned in between the anode and cathode flow paths while the anode and cathode are connected to an electrical load, such as a battery or to an electric motor.

In operation, the hydrogen flow through the anode flow path disassociates the hydrogen into protons and electrons. The protons conduct through an electrolytic membrane directly to the cathode while the electrons travel through the electric load 94. At the cathode, the oxygen molecules combine with the disassociated hydrogen to form water. Consequently, the exhaust or outflow from the cathode flow path comprises primarily nitrogen and water vapor, sometimes referred to as off-gas.

The hydrogen is typically obtained from hydrogen storage tanks. The oxygen used for the fuel cell is often obtained from environmental air. The content of air is about 21% oxygen and 58% nitrogen. The air can be fed to a system that may provide oxygen enriched air (OEA) to the fuel cell/fuel cell stack, and leaving oxygen depleted air (ODA) or the aforementioned off-gas, i.e., nitrogen, as a byproduct.

In accordance with various embodiments, instead of, e.g., releasing the off-gas into the environment, the nitrogen can be collected for later use. For example, nitrogen can be collected and later sold as industrial nitrogen. While there are various grades of industrial nitrogen, usually a content of approximately 90% nitrogen (or higher) may be considered industrial grade.

In some embodiments, the nitrogen gas is compressed back into a storage vessel, e.g., tank, whether it be a tank(s) previously holding hydrogen or a dedicated nitrogen holding tank(s). With current designs, hydrogen storage tanks are banked/coupled in parallel such that they all discharge/recharge at same time. In many instances, the tanks may be recharged when only a small fraction of the hydrogen is used. Thus, they may be recharged more often than if they were being used independently.

In some embodiments, the ability to control which tank of banked/coupled tanks is charged and discharged is provided such that the durability of the tanks is increased and the overall system can be better balanced. Additionally, an empty tank(s) can be identified and isolated, and used to collect recovered nitrogen. It should be noted that a tank cannot ever be completely empty, and may require about 2 MPa of hydrogen to be present. Thus, if a hydrogen storage tank is being used to collect nitrogen, it may still contain a certain amount hydrogen (which can be removed via purging and bleeding processes if desired).

Because compressing nitrogen requires energy, various embodiments perform the nitrogen compression process at a time when the vehicle has available/excess energy that can be leveraged. It should be noted that excess energy in vehicles is typically wasted/dissipated in the form of heat or via service brakes. Any vehicle operation(s) or process(es) that result(s) in the generation of excess energy can be used to perform the nitrogen compression process. For example, depending on vehicle operating conditions, excess energy from regenerative braking can be leveraged in accordance with various embodiments.

By way of example, a high voltage (HV) battery may only be able to store a certain amount of energy. In the event that the HV battery is at capacity and cannot accept additional energy, that excess energy (as alluded to above) is often shed through heat or dissipated with service brakes. In accordance with some embodiments, when the HV battery state of charge (SOC) is full, the excess energy from, e.g., regeneration, or the like, can be used to compress the nitrogen off-gas from the fuel cell. This nitrogen could then be recovered from the vehicle (for example, when recharging the vehicle with hydrogen) and can be sold as industrial nitrogen.

Additional control systems may be provided to control and monitor partial pressures of the tanks, as well as systems to purify the nitrogen by various purging and bleeding processes.

An FCV 100 is shown in FIG. 1 as a representative electrified vehicle. In this description, uses of "front," "forward" and the like, and uses of "rear," "rearward" and the like, refer to the longitudinal directions of the FCV 100. "Front," "forward" and the like refer to the front (fore) of the FCV 100, while "rear," "rearward" and the like refer to the back (aft) of the FCV 100. Uses of "side," "sideways," "transverse" and the like refer to the lateral directions of the FCV 100, with "driver's side" and the like referring to the left side of the FCV 100, and "passenger side" and the like referring to the right side of the FCV 100.

In FIG. 1, the FCV 100 is shown to be a semi-tractor or, in other words, a tractor unit that, together with a hitched semitrailer 102, forms a semi-truck. The FCV 100 has an exterior and a number of interior compartments. The compartments include a passenger compartment 104 and one or more engine compartments 106. The FCV 100 may include, among other things, seats and a dash assembly housed in its passenger compartment 104.

The FCV 100 has a body 108 that forms its exterior and defines its compartments. The body 108 has upright sides, a floor, a front end, a rear end, a roof and the like. In the semi-truck to which the FCV 100 belongs, the semitrailer 102 similarly has an exterior and, as an interior compartment, a cargo compartment for carrying cargo. In addition to the body 108, the FCV 100 has a chassis 110. The chassis 110 serves as an underbody for the FCV 100. The chassis 110, like the body 108, forms the exterior of the FCV 100. As part of the chassis 110, the FCV 100 includes a hitch 112 for hitching the semitrailer 102 to the FCV 100. With the semitrailer 102 hitched to the FCV 100, the FCV 100 is operable to pull the semitrailer 102 and any onboard cargo.

The FCV 100 has a drivetrain. The drivetrain is part of, mounted to or otherwise supported by the chassis 110. The drivetrain may be housed, in whole or in part, in any combination of the passenger compartment 104, the engine compartments 106 or elsewhere in the FCV 100. As part of the drivetrain, the FCV 100 includes wheels 114. The wheels 114 support the remainder of the FCV 100 on the ground. The FCV 100 includes ten wheels 114, two of which are front wheels 114F, and eight of which are rear wheels 114R. The rear wheels 114R are arranged in four dual-wheel setups. The rear wheels 114R belonging to two driver's side dual-wheel setups are shown, with the other two, passenger side dual-wheel setups being mirror images that include the remaining rear wheels 114R. One, some or all of the wheels 114 are powered to drive the FCV 100 along the ground. In a rear-wheel drive arrangement, one, some or all of the rear wheels 114R are powered to drive the FCV 100 along the ground. For this purpose, also as part of the drivetrain, in addition to the wheels 114, the FCV 100 includes any penultimate combination of a transmission, a differential, a drive shaft and the like, to which the wheels 114 are mechanically connected. It should be understood that various embodiments may be implemented in other types of FCVs, e.g., passenger FCVs that may similar or non-similar components/aspects as those described above in the context of an FCV semi-tractor.

The FCV 100 operates as an assembly of interconnected items that equip the FCV 100 to satisfy real-time vehicle demands. Generally speaking, a vehicle demand corresponds to a vehicle function whose performance satisfies the vehicle demand. Accordingly, the FCV 100 is equipped, in operation, to satisfy one or more vehicle demands by performing one or more corresponding vehicle functions. With respect to performing vehicle functions, the FCV 100 is subject to any combination of manual operation and autonomous operation. In the case of manual operation, the FCV 100 may be manual-only. In the case of autonomous operation, the FCV 100 may be semi-autonomous, highly-autonomous or fully-autonomous.

For purposes of satisfying vehicle demands, the FCV 100 includes one or more vehicle systems 120. Either alone or in conjunction with the drivetrain, the vehicle systems 120 are operable to perform vehicle functions on behalf of the FCV 100, and thereby satisfy corresponding vehicle demands on behalf of the FCV 100. Any combination of the vehicle systems 120 may be operable to perform a vehicle function. Accordingly, from the perspective of a vehicle function, as well as a corresponding vehicle demand, one, some or all of the vehicle systems 120 serve as associated vehicle systems 120. Moreover, each vehicle system 120 may be operable to perform any combination of vehicle functions, and thereby satisfy any combination of corresponding vehicle demands, in whole or in part. Accordingly, each vehicle system 120, from its own perspective, serves as an associated vehicle system 120 for one or more vehicle functions, as well as one or more corresponding vehicle demands.

In addition to the vehicle systems 120, the FCV 100 includes a sensor system 122, as well as one or more processors 124, memory 126, and one or more control modules 128 to which the vehicle systems 120 and the sensor system 122 are communicatively connected. The sensor system 122 is operable to detect information about the FCV 100. The processors 124, the memory 126 and the control modules 128 together serve as one or more computing devices whose control modules 128 are employable to orchestrate the operation of the FCV 100.

Specifically, the control modules 128 operate the vehicle systems 120 based on information about the FCV 100. Accordingly, as a prerequisite to operating the vehicle systems 120, the control modules 128 gather information about the FCV 100, including any combination of the information about the FCV 100 detected by the sensor system 122 and information about the FCV 100 communicated between the control modules 128. The control modules 128 then evaluate the information about the FCV 100, and operate the vehicle systems 120 based on their evaluation. As part of their evaluation of the information about the FCV 100, the control modules 128 identify one or more vehicle demands. Relatedly, as part of their operation of the vehicle systems 120, when a vehicle demand is identified, the control modules 128 operate one or more associated vehicle systems 120 to satisfy the vehicle demand, while maintaining the fuel cell and batteries within their operative range with respect to SOC, power, temperature, etc.). For example, actuation of an accelerator pedal of FCV 100 results in a request for some particular, desired amount of torque to be applied to wheels 114 vis-à-vis energy system 152 providing energy to propulsion system 154 to drive wheels 114 (described in greater detail below).

Vehicle Systems

The vehicle systems 120 are part of, mounted to or otherwise supported by the chassis 110. The vehicle systems 120 may be housed, in whole or in part, in any combination of the passenger compartment 104, the engine compartments 106 or elsewhere in the FCV 100. Each vehicle system 120 includes one or more vehicle elements. On behalf of the vehicle system 120 to which it belongs, each vehicle element is operable to perform, in whole or in part, any combination of vehicle functions with which the vehicle system 120 is associated. It will be understood that the vehicle elements, as well as the vehicle systems 120 to which they belong, may but need not be mutually distinct.

The vehicle systems 120 include an energy supersystem 130 and a propulsion supersystem 132. The energy supersystem 130 and the propulsion supersystem 132 are electrically connected to one another. Moreover, the drivetrain is mechanically connected to the propulsion supersystem 132. The propulsion supersystem 132 and the drivetrain together serve as an electrified powertrain for the FCV 100. The energy supersystem 130 is operable to perform one or more energy functions, including but not limited to generating electrical energy. The propulsion supersystem 132 is operable to perform one or more propulsion functions using electrical energy from the energy supersystem 130, including but not limited to powering the wheels 114.

Specifically, the energy supersystem 130 is operable to generate electrical energy, store electrical energy, condition and otherwise handle electrical energy, and store and otherwise handle fuel. In conjunction with the drivetrain, the propulsion supersystem 132 is operable to power the wheels 114 using electrical energy from the energy supersystem 130. With the wheels 114 powered, the propulsion supersystem 132 is employable to accelerate the FCV 100, maintain the speed of the FCV 100 (e.g., on level or uphill ground) and otherwise drive the FCV 100 along the ground. The propulsion supersystem 132 is also operable to generate electrical energy using one, some or all of the wheels 114, and consequently retard the wheels 114. With the wheels 114 retarded, the propulsion supersystem 132 is employable to decelerate the FCV 100, maintain the speed of the FCV 100 (e.g., on downhill ground) and otherwise drive the FCV 100 along the ground. The energy supersystem 130, in turn, is operable to store electrical energy from the propulsion supersystem 132. As the combined product of generating electrical energy, and consequently retarding the wheels 114, and storing electrical energy, the propulsion supersystem 132 and the energy supersystem 130 are operable to regeneratively brake the FCV 100 at the wheels 114.

In addition to the energy supersystem 130 and the propulsion supersystem 132, the vehicle systems 120 include one or more auxiliary systems 134. The auxiliary systems 134 include a braking system 140, a steering system 142, a heating/cooling system 144, and an accessory system 146. The auxiliary systems 134, like the propulsion supersystem 132, are electrically connected to the energy supersystem 130. The auxiliary systems 134 are operable to perform one or more auxiliary functions using electrical energy from the energy supersystem 130, including but not limited to frictionally braking the FCV 100, steering the FCV 100, cooling the FCV 100, heating the FCV 100 and one or more accessory functions. Accordingly, although the propulsion supersystem 132 acts as the principal electrical load on the energy supersystem 130, the auxiliary systems 134 act as electrical loads on the energy supersystem 130 as well.

Sensor System

As part of the sensor system 122, the FCV 100 includes one or more onboard sensors. The sensors monitor the FCV 100 in real-time. The sensors, on behalf of the sensor system 122, are operable to detect information about the FCV 100, including information about user requests and information about the operation of the FCV 100. For example, sensor system 122 may monitor the state of charge (SOC) of a battery of battery system 162, and power and temperature of the fuel cell stack and the batteries through constant monitoring of voltages, currents, temperatures associated with/relevant to the fuel cell stack and batteries.

The FCV 100 includes user controls. The user controls serve as interfaces between users of the FCV 100 and the FCV 100 itself, and are operable to receive mechanical, verbal and other user inputs requesting vehicle functions. In conjunction with corresponding user controls, and among the sensors 122, the FCV 100 includes an accelerator pedal sensor, a brake pedal sensor, a steering angle sensor and the like, and one or more selector sensors, one or more microphones, one or more cameras and the like. Relatedly, among information about user requests, the sensor system 122 is operable to detect user inputs requesting powering the wheels 114 (e.g., vis-à-vis the accelerator pedal), user inputs requesting braking, steering and the like, user inputs requesting heating, cooling and the like, as well as user inputs requesting accessory functions.

Also among the sensors 122, the FCV 100 includes one or more speedometers, one or more gyroscopes, one or more accelerometers, one or more wheel sensors, one or more thermometers, one or more inertial measurement units (IMUs), one or more controller area network (CAN) sensors and the like. Relatedly, among information about the operation of the FCV 100, the sensor system 122 is operable to detect the location and motion of the FCV 100, including its speed, acceleration, orientation, rotation, direction and the like, the movement of the wheels 114, temperatures of the FCV 100, and the operational statuses of one, some or all of the vehicle systems 120.

Control Modules.

As noted above, the processors 124, the memory 126 and the control modules 128 together serve as one or more computing devices whose control modules 128 orchestrate the operation of the FCV 100. The control modules 128 include a global control module 128G. Relatedly, as part of a central control system, the FCV 100 includes a global control unit (GCU) to which the global control module 128G belongs. Although the FCV 100, as shown, includes one global control module 128G, it will be understood that this disclosure is applicable in principle to otherwise similar vehicles including multiple global control modules 128G. The control modules 128 also include one or more power control modules 128P. Relatedly, the FCV 100 includes one or more power control units (PCUs) to which the power control modules 128P belong. Although the processors 124 and the memory 126 are shown as being common to the GCU and the PCUs, it is contemplated that one, some or all of the GCU and the PCUs could be a standalone computing device with one or more dedicated processors 124 and dedicated memory 126.

The global control module 128G orchestrates the global operation of the FCV 100, including but not limited to the operation of the vehicle systems 120, on behalf of the GCU. The power control modules 128P orchestrate the operation of the energy supersystem 130 and the propulsion supersystem 132, as well as certain auxiliary systems 146, on behalf of the PCUs.

The processors 124 may be any components configured to execute any of the processes described herein or any form of instructions to carry out such processes or cause such processes to be performed. The processors 124 may be implemented with one or more general purpose or special purpose processors. Examples of suitable processors 124 include microprocessors, microcontrollers, digital signal processors or other forms of circuitry that execute software. Other examples of suitable processors 124 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 124 may include at least one hardware circuit (e.g., an integrated circuit) configured to carry out instructions contained in program code. In arrangements where there are multiple processors 124, the processors 124 may work independently from each other or in combination with one another.

The memory 126 is a non-transitory computer readable medium. The memory 126 may include volatile or nonvolatile memory, or both. Examples of suitable memory 126 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 126 includes stored instructions in program code. Such instructions are executable by the processors 124 or the control modules 128. The memory 126 may be part of the processors 124 or the control modules 128, or may be communicatively connected the processors 124 or the control modules 128.

Generally speaking, the control modules 128 include instructions that may be executed by the processors 124. The control modules 128 may be implemented as computer readable program code that, when executed by the processors 124, execute one or more of the processes described herein. Such computer readable program code may be stored on the memory 126. The control modules 128 may be part of the processors 124, or may be communicatively connected the processors 124.

Power Modules

As noted above, the vehicle systems 120 are operable to perform vehicle functions on behalf of the FCV 100, and thereby satisfy corresponding vehicle demands on behalf of the FCV 100. Specifically, the energy supersystem 130 is operable to perform energy functions, and thereby satisfy corresponding energy demands, the propulsion supersystem 132 is operable to perform propulsion functions, and thereby satisfy corresponding propulsion demands, and the auxiliary systems 134 are operable to perform auxiliary functions, and thereby satisfy corresponding auxiliary demands.

From the perspective of the global control module 128G and the power control modules 128P, and the orchestration of the global operation of the FCV 100, the vehicle demands include one or more global vehicle demands or, in other words, vehicle demands common to the FCV 100. Specifically, one or more of the energy demands are global energy demands, and one or more of the propulsion demands are global propulsion demands. The global energy demands may include any combination of one or more demands to generate electrical energy, one or more demands to store electrical energy, and one or more demands to store and otherwise handle fuel. The global propulsion demands may include one or more demands to power the wheels 114 and one or more demands to retard the wheels 114. Any combination of the global energy demands and the global propulsion demands may be part of global combined energy and propulsion demands, such as one or more demands to regeneratively brake the FCV 100. Moreover, each auxiliary demand is a global auxiliary demand. The global auxiliary demands may include any combination of one or more demands to frictionally brake the FCV 100, one or more demands to steer the FCV 100, one or more demands to cool the FCV 100, one or more demands to heat the FCV 100 and one or more demands to perform accessory functions.

Beyond being equipped to satisfy the global vehicle demands by performing corresponding vehicle functions, the FCV 100 is equipped to satisfy one or more vehicle demand requirements. Specifically, in relation to being operable to perform vehicle functions, and thereby satisfy corresponding global vehicle demands, the vehicle systems 120 have the capacity to satisfy vehicle demand requirements on behalf of the FCV 100. Accordingly, the energy supersystem 130 has the capacity to satisfy certain energy demand requirements, the propulsion supersystem 132 has the capacity to satisfy certain propulsion demand requirements, and the auxiliary systems 134 have the capacity to satisfy certain auxiliary demand requirements.

Generally speaking, vehicle demand requirements are specific to particular vehicle applications. For example, the FCV 100, as a semi-tractor application, has higher energy demand requirements and higher propulsion demand requirements than many other vehicle applications. In some cases, the FCV 100 could have multiple times the energy demand requirements and multiple times the propulsion demand requirements of other vehicle applications.

FCV 100 may include a power module 150. Although the FCV 100, as shown, includes one power modules 150, it will be understood that this disclosure is applicable in principle to otherwise similar vehicles including two or more power modules 150. In the FCV 100, the energy supersystem 130 and the propulsion supersystem 132 are arranged across the power module 150, with power module 150 including an energy system 152 and a propulsion system 154.

In power module 150, the propulsion system 154 and the energy system 152 are electrically connected to one another. Moreover, the drivetrain is mechanically connected to each propulsion system 154. On behalf of the power module 150, each energy system 152 is operable to perform energy functions with which the energy supersystem 130 is associated, including but not limited to generating electrical energy. Propulsion system 154 is operable to perform propulsion functions with which the propulsion supersystem 132 is associated using electrical energy, including but not limited to powering the wheels 114. Propulsion system 154 is, specifically, operable to perform propulsion functions using electrical energy from the energy system 152 of the power module 150 to which it and the energy system 152 belong.

Energy system 152, and the power module 150 to which it belongs, includes a fuel cell system 160, a battery system 162 and a fuel tank system 164. Propulsion system 154, and the power module 150 to which it belongs, includes a motor system 166. Inside power module 150, the motor system 166 is electrically connected to the fuel cell system 160. Moreover, the battery system 162 and the fuel cell system 160 are electrically connected to one another, and the motor system 166 and the battery system 162 are electrically connected to one another. Moreover, the fuel cell system 160 is fluidly connected to the fuel tank system 164. The fuel cell system 160 is operable to generate electrical energy using electrical energy from the battery system 162 and fuel from the fuel tank system 164. In conjunction with the drivetrain, the motor system 166 is operable to power the wheels 114 using electrical energy from any combination of the fuel cell system 160 and the battery system 162. As alluded to above, electrified vehicles may utilize motors/motor generators. That is, motor system 166 is also operable to generate electrical energy using the wheels 114, and consequently retard the wheels 114. The battery system 162 is operable to store electrical energy from the fuel cell system 160. The battery system 162 is also operable to store electrical energy from the motor system 166, (which is responsible for collecting the energy regenerated from braking). The fuel tank system 164 is operable to store and otherwise handle fuel, including fueling the fuel cell system 160 with fuel.

Although vehicle demand requirements are specific to particular vehicle applications, some vehicle demand requirements are less application-dependent than others. The FCV 100, for instance, even as a semi-tractor application, still has similar auxiliary demand requirements as many other vehicle applications. In the FCV 100, the auxiliary systems 134, rather than having multiple counterpart relationships, are common to the FCV 100. At power module 150, each auxiliary element, either individually or as part of the auxiliary system 134 to which it belongs, as the case may be, is electrically connected to the energy system 152. On behalf of the FCV 100 and the auxiliary system 134 to which it belongs, each auxiliary element is operable to perform auxiliary functions using electrical energy from the energy system 152. Accordingly, in power module 150, although the propulsion system 154 acts as the principal electrical load on the energy system 152, the auxiliary elements act as electrical loads on the energy system 152 as well.

As noted above, the power control modules 128P orchestrate the operation of the energy supersystem 130 and the propulsion supersystem 132, as well as certain auxiliary systems 146. That is, power control module 128P orchestrates the operation of the power module 150, including the operation of the energy system 152 and the operation of the propulsion system 154, as well as the operation of the auxiliary elements.

Energy System and Propulsion System.

As noted above, power module 150 includes an energy system 152 and a propulsion system 154. Energy system 152 includes a fuel cell system 160, a battery system 162 and a fuel tank system 164. Inside power module 150, a motor system 166 is electrically connected to the fuel cell system 160 through, e.g., a junction box (not shown). Moreover, the battery system 162 and the fuel cell system 160 are electrically connected to one another through the junction box, and the motor system 166 and the battery system 162 are also electrically connected to one another through the junction box.

Figure 2A:
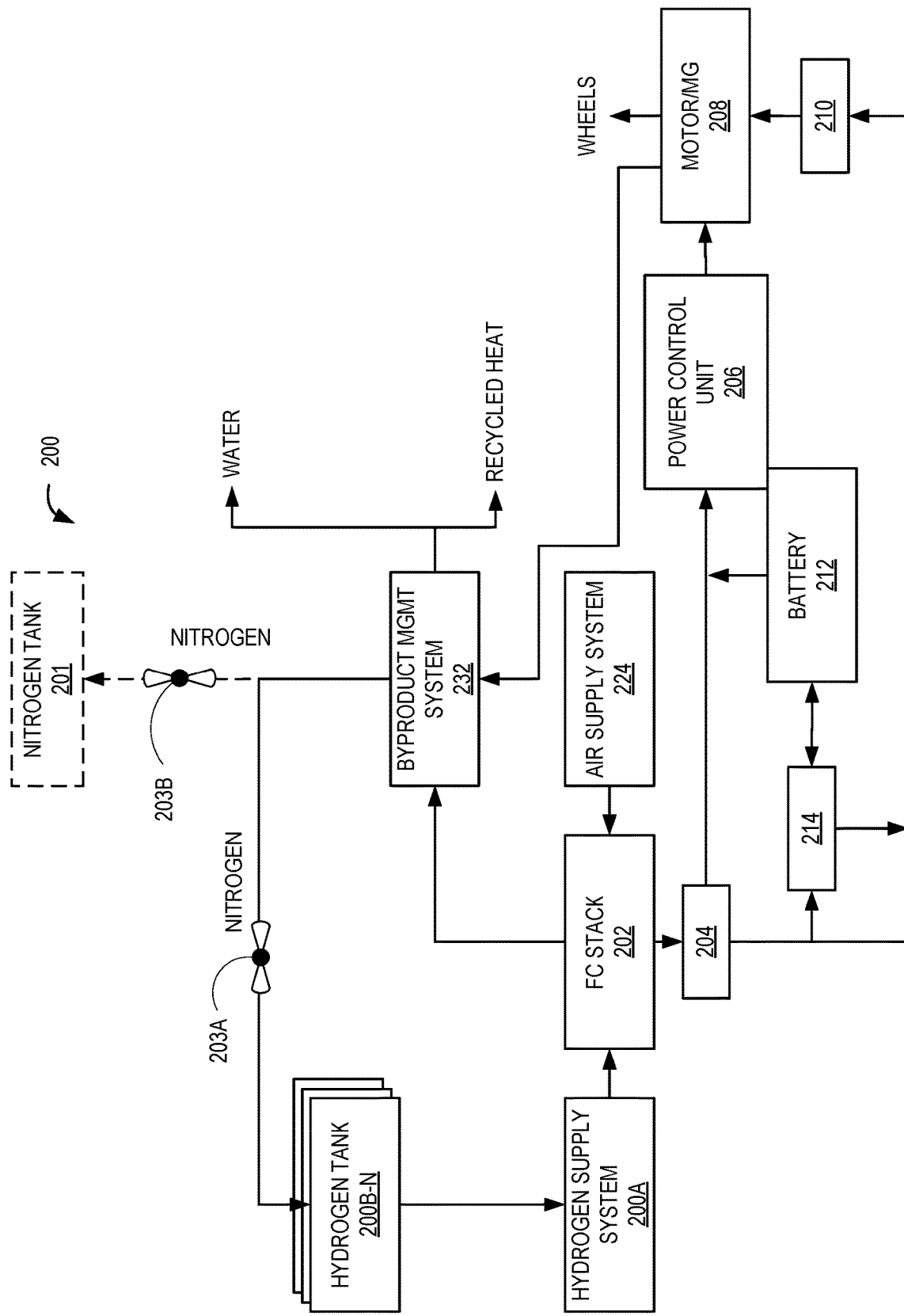
FIG. 2A illustrates an example of a fuel cell system used in the example fuel cell vehicle of FIG. 1 in accordance with one embodiment.

Referring now to FIG. 2A, an example schematic representation of an example energy system 200 is illustrated. Example energy system 200 may be one embodiment of energy system 152 of FIG. 1. FCV 100 includes one or more energy elements as part of the fuel cell system 160. Among the energy elements of the fuel cell system 160, the FCV 100 includes a fuel cell stack 202. Although the FCV 100, as shown, includes one fuel cell stack 202 per fuel cell system 160, it will be understood that this disclosure is applicable in principle to otherwise similar vehicles including multiple fuel cell stacks 202 per fuel cell system 160. In relation to the fuel cell stack 202, among the attendant energy elements of the energy system 152, the FCV 100 includes a fuel cell converter 204. The fuel cell converter 204 is electrically connected to the fuel cell stack 202. The fuel cell stack 202 is operable to generate electrical energy. The fuel cell converter 204 is operable to condition electrical energy from the fuel cell stack 202. Specifically, the fuel cell converter 204 is a DC/DC converter operable to convert lower voltage DC electrical energy from the fuel cell stack 202 into higher voltage DC electrical energy. For instance, the lower voltage DC electrical energy may be medium voltage DC electrical energy, and the higher voltage DC electrical energy may be high voltage DC electrical energy.

The FCV 100 also includes one or more propulsion elements as part of the motor system 166. Among the propulsion elements of the motor system 166, the FCV 100 includes a motor/motor generator 208. Although the FCV 100, as shown, includes one motor 208 per motor system 166, it will be understood that this disclosure is applicable in principle to otherwise similar vehicles including multiple motors 208 per motor system 166. The motor 208 can be a synchronous three-phase AC electric motor. In relation to the motor 208, among the attendant energy elements of the energy system 152, the FCV 100 includes a motor inverter 210. The motor inverter 208 is electrically connected to the fuel cell converter 204 through the junction box, and the motor 208 is electrically connected to the motor inverter 210. Moreover, the drivetrain is mechanically connected to the motor 208. The motor inverter 210 is operable to condition electrical energy from the fuel cell converter 204. Specifically, the motor inverter 210 is operable to convert DC electrical energy from the fuel cell converter 204 into three-phase AC electrical energy. For instance, the three-phase AC electrical energy may be high voltage AC electrical energy. In conjunction with the drivetrain, the motor 208 is operable to power the wheels 114 using electrical energy from the motor inverter 210.

The FCV 100 may also include one or more energy elements as part of the battery system 162. Among the energy elements of the battery system 162, the FCV 100 includes a battery 212. It should be understood that in some embodiments, fuel cell stack 202 may be considered/referred to as a primary energy/power source, while battery 212 is considered/referred to as a secondary batter/energy/power source. In relation to battery 212, among the attendant energy elements of the energy system 152, the FCV 100 includes a battery converter 214. From the perspective of the fuel cell system 160, the battery converter 214 is electrically connected to the fuel cell converter 204 through the junction box, and the battery 212 is electrically connected to the battery converter 214 through the junction box. The battery converter 214 is operable to condition electrical energy from the fuel cell converter 204. Specifically, the battery converter 214 may be a DC/DC converter operable to convert higher voltage DC electrical energy from the fuel cell converter 204 into lower voltage DC electrical energy. For instance, the higher voltage DC electrical energy may be high voltage DC electrical energy, and the lower voltage DC electrical energy may be medium voltage DC electrical energy. The battery 212 is operable to store electrical energy from the battery converter 214.

Also, from the perspective of the battery system 162, the battery converter 214 is electrically connected to the battery 212 through the junction box, the motor inverter 210 is electrically connected to the battery converter 214 through the junction box, and, as noted above, the motor 208 is electrically connected to the motor inverter 210. Relatedly, the battery converter 214 is also operable to condition electrical energy from the battery 212. Specifically, the battery converter 214 is a DC/DC converter operable to convert lower voltage DC electrical energy from the battery 212 into higher voltage DC electrical energy. For instance, the lower voltage DC electrical energy may be medium voltage DC electrical energy, and the higher voltage DC electrical energy may be high voltage DC electrical energy. The motor inverter 210 is also operable to condition electrical energy from the battery converter 214. Specifically, the motor inverter 210 is operable to convert DC electrical energy from the battery converter 214 into three-phase AC electrical energy. As noted above, the three-phase AC electrical energy may be high voltage AC electrical energy. Once again, in conjunction with the drivetrain, the motor 208 is operable to power the wheels 114 using electrical energy from the motor inverter 210.

Similarly, from the perspective of the motor system 166, the motor inverter 210 is electrically connected to the motor 208, the battery converter 214 is electrically connected to the motor inverter 210 through the junction box, and, as noted above, the battery 212 is electrically connected to the battery converter 214 through the junction box. Relatedly, in conjunction with the drivetrain, the motor 208 is also operable to generate electrical energy using the wheels 114, and consequently retard the wheels 114. Moreover, the motor inverter 210 is also operable to condition electrical energy from the motor 208. Specifically, the 208 inverter 210 is operable to convert three-phase AC electrical energy from the motor 208 into DC electrical energy. For instance, the three-phase AC electrical energy may be high voltage AC electrical energy, and the DC electrical energy may be high voltage DC electrical energy. The battery converter 214 is also operable to condition electrical energy from the motor inverter 210 in the same manner as electrical energy from the fuel cell converter 204. Once again, battery 212 is operable to store electrical energy from the battery converter 214. As the combined product of generating electrical energy, consequently retarding the wheels 114 and storing electrical energy, the motor 208 and battery 212 are operable to regeneratively brake the FCV 100 at the wheels 114.

Among other things, it follows that the motor 208 is operable to power the wheels 114 using electrical energy from any combination of the fuel cell stack 202 and battery 212. Moreover, battery 212 is operable to store electrical energy from the fuel cell stack 202. In a fuel-cell-powered implementation, the motor 208 principally powers the wheels 114 using electrical energy from the fuel cell stack 202. In cases of shortages, the motor 208 powers the wheels 114 using a combination of electrical energy from the fuel cell stack 202 and supplementary electrical energy from battery 212. On the other hand, in cases of surpluses, the motor 208 powers the wheels 114 using some electrical energy from the fuel cell stack 202, and battery 212 may store the remaining electrical energy from the fuel cell stack 202.

As noted above, the FCV 100 includes the fuel cell stack 202 among the energy elements of the fuel cell system 160. Fuel cell stack 202 is fluidly connected to a fuel (in this example, hydrogen) supply system 200A (described in greater detail below) and to a fuel/hydrogen tanks 200B-200N (also described in greater detail below). It should be noted that other elements, components, units, such as other inverters, converters, pumps, filters and the like may be used in energy system 200, but are not shown for ease of reference. For example, a pump inverter may be operable to condition electrical energy (DC to three-phase AC) from a power supply unit electrically connected to fuel cell stack 202. For example, a fuel pump is operable to pump fuel from the fuel tank(s) 200B-200N into the fuel cell stack 202.

Also among the energy elements of the fuel cell system 160, the FCV 100 includes an air compressor, filter, and humidifiers, which may be a part of air supply system 224. The air supply system 224 is operable to pump air into the fuel cell stack 202 using electrical energy from a compressor inverter (not shown).

The fuel cell stack 202 includes one or more fuel cells. The fuel cell stack 202 is operable to employ the fuel cells to execute a chemical reaction that combines fuel from a fuel pump (which may be a part of fuel supply system 200A) with oxygen in air from the air supply system 224, and generate electrical energy.

In a hydrogen-fueled implementation, the fuel is hydrogen fuel. In the fuel cell stack 202, each fuel cell includes an anode and a cathode. In each fuel cell, hydrogen fuel (from fuel/hydrogen tank(s) 200B-200N and via fuel/hydrogen supply system 200A) is pumped to the anode where, as part of the chemical reaction, hydrogen molecules are activated by an anode catalyst. The hydrogen molecules thereby release electrons, and become hydrogen ions. The released electrons travel from the anode to the cathode, thereby generating electrical current. The electrical current generated by the fuel cells serves as the electrical energy generated by the fuel cell stack 202. In each fuel cell, the hydrogen ions also travel from the anode to the cathode. Oxygen in air from the air supply system 224 is pumped to the cathode where, as part of the chemical reaction, the hydrogen ions bond with oxygen on a cathode catalyst to generate water. In the hydrogen-fueled implementation, each fuel tank(s) 200B-200N is a high-pressure hydrogen tank operable to store hydrogen fuel.

Several byproducts result from the generation of electrical energy by way of fuel cell stack 202, i.e., water, nitrogen-rich air (also referred to as off-gas), and heat. Accordingly, a byproduct (e.g., water/heat/gas) management system 232 may be operatively connected to fuel cell stack 202 to process and contain (or expel) the water/heat (and any off-gas) as needed. For example, byproduct management system 232 may comprise water and coolant loops to element waste heat/water. For example, heat from fuel cell stack 202 may be harvested and used to heat the cabin of FCV 100. Ultimately, electricity produced by fuel cell stack 202 is routed (as described in part above) through power control unit 206 to motor 208, which assistance from battery 212 (as needed) to provide additional power.

In terms of the off-gas, i.e., nitrogen, byproduct management system 232 may route nitrogen for storage back to one or more of hydrogen tank(s) 200B-200N. As alluded to above, hydrogen tanks 200B-200N are typically banked or coupled such that hydrogen tanks 200B-200N may be charged with hydrogen and may have hydrogen discharged therefrom as a unit. For example, some amount of hydrogen can be discharged from all of hydrogen tanks 200B-200N at the same time/in accordance with some order to provide hydrogen to hydrogen supply system 200A at a given time. Therefore, and in accordance with various embodiments, hydrogen tank(s) 200B-200N may each be individually controlled regarding charging with/discharging of hydrogen gas as well as with nitrogen gas.

In some embodiments, the off-gas, in this case, nitrogen, can be routed from byproduct management system 232 to a dedicated nitrogen tank 201. It should be understood that in some embodiments, the hydrogen is to be depleted prior to inputting nitrogen to avoid contaminating the hydrogen rendering it unusable as a fuel supply. Filling dedicated nitrogen tank 2901 first allows time for the hydrogen tank(s) 200B-200N to become depleted to the point where no useable hydrogen fuel is left, at which point, such hydrogen tanks 200B-200N can be filled.

A valve (or similar device/mechanism) 203A implemented between the line/path through which nitrogen is dispelled from/by byproduct management system 232 can isolate hydrogen tanks 200B-N from any nitrogen output by byproduct management system 232. Additionally, a valve/similar mechanism 230B to isolate, when needed, nitrogen tank 201 from the nitrogen supply.

Figure 2B:
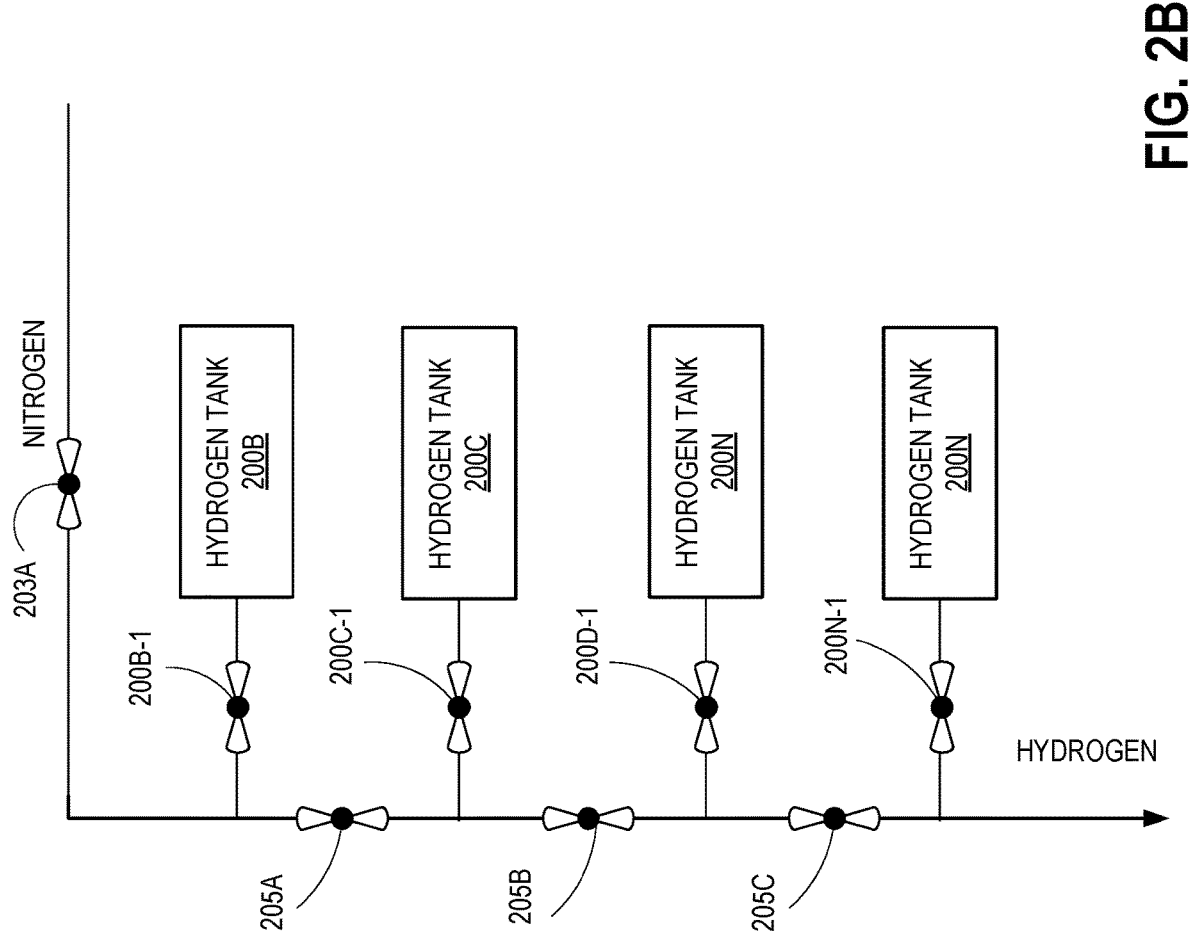
FIG. 2B illustrates an expanded view of a hydrogen storage aspect of the fuel cell system of FIG. 1 in accordance with one embodiment.

FIG. 2B illustrates aspects of the hydrogen storage aspect of energy system 200. As described above, hydrogen may be stored in hydrogen tanks 200B-N. Valves or similar mechanisms may be used to control the flow of hydrogen/nitrogen in energy system 200. For example, nitrogen tank 201 (FIG. 2A) may be filled with nitrogen. Once nitrogen tank 201 is full of nitrogen, valve 203A may be used to isolate nitrogen tank 201 from hydrogen tanks 200B-N (as discussed above). If, for example, hydrogen tank 20)B is empty/purged of hydrogen, hydrogen tank 200B may be isolated from hydrogen supply system 200A via, in this non-limiting example, valve 205A. Hydrogen tank 200B may then be filled with excess nitrogen from byproduct management system 232. It should be understood that valves 203A and 200B-1 may be operated/controlled to allow nitrogen to be routed to hydrogen tank 200B. It should be understood that valves 200C-1, 200D-1, 200N-1, as well as valves 205B/C may be similarly operated or controlled to isolate and fill hydrogen tanks (when empty of usable hydrogen).

Whether one or more of hydrogen tank(s) 200B-200N or dedicated nitrogen tank 201 is used to collect nitrogen gas from byproduct management system 232, the collected nitrogen gas can be discharged via a hose or similar apparatus that can be connected to nitrogen tank 201. The nitrogen from nitrogen tank 201 may be discharged through the hose/similar mechanism to another tank or holding apparatus at, e.g., a fueling station or nitrogen collection facility, etc. A pump (not shown) can be used to transfer the nitrogen from nitrogen tank 201 to the other/holding tank through the hose. Moreover, using one or more of the aforementioned valves, nitrogen stored in one or more of hydrogen tanks 200B-N can be routed for storage in nitrogen tank 201 if nitrogen tank 201 is empty/is capable of accepting nitrogen.

In the drivetrain, any penultimate combination of a transmission, a differential, a drive shaft and the like, to which the wheels 114 are mechanically connected, is mechanically connected to some output coupling (not shown) such that the drivetrain is mechanically connected to the motor 208.

Again, motor 208 (or other motors/motor-generators if more than one motor is implemented) from fuel cell stack 202 or battery 212. As opposed to the codependent spinning action by motor 208, in the mechanical domain, the wheels 114 are subject to being powered using electrical energy from any combination of the energy systems 152 of the power module 150 to which motor 208 and the energy systems 152 respectively belong. As the product of the wheels 114 spinning the output coupling about a motor axis (not shown), motor 208 is also operable to generate electrical energy using the wheels 114 (regenerative braking), and consequently retard the wheels 114.

Generally speaking, from the perspective of power module 150, the use of resources is commensurate with the satisfaction of global vehicle demands. One goal of contributorily satisfying global vehicle demands is resource balancing or, in other words, balancing fuel, electrical energy and other resources. Specifically, resource balancing is the product of load balancing or, in other words, balancing electrical and other loads, and load balancing, in turn, is the product of contributorily satisfying global vehicle demands.

As alluded to above, and for example, a typical heavy duty truck (HDT) application, the fuel cell system employs a proton electrolyte membrane fuel cell (PEM FC) as a primary energy source for truck traction. A secondary battery/set of batteries can be used as a power booster in the event greater power than can be delivered via electrical energy from the fuel cell is needed to achieve some desired level of acceleration, for example, or to meet both propulsion system and auxiliary system(s) demands, etc. For example, a semi-tractor used for drayage may be equipped with two 114 kW fuel cell stacks (with a total power of 228 kW), and two 12 kWh power lithium-ion battery packs. In such a conventional architecture, the two fuel cell stacks typically provide driving/motive energy, while each power battery pack provides extra power to when needed, and can recoup energy via regenerative braking as described above. The fuel cell stacks may also be responsible for charging the power battery packs. The weight of such a vehicle is approximately 80,000 lbs, where the total maximum power from the fuel cell stacks and batteries is approximately 500 kW with a driving range of approximately 300 miles.

The size of a fuel cell system including the fuel cell stack and fuel tank (e.g., fuel cell stack 202 and hydrogen tank(s) 200B-200N) tend to be large in size. For example, a typical FC HDT is usually equipped with 228 kW (maximum power) fuel cell stacks. It should be understood that the maximum power of a fuel cell stack is limited or dictated by the basic electrochemistry used in the fuel cell, increasing maximum power necessitates a corresponding increase in fuel cell capacity using a bigger fuel cell stack.

It should be understood that in some embodiments, battery 212 may comprise a battery/have an electrochemical makeup such that battery 304A has and high power density, low energy density, and long life. This can be accomplished through varying chemical compounds and composition in a battery. Battery 212 can be frequently charged or recharged due to having more power density and longer cycle life. In some embodiments, charging/recharging battery 212 can be accomplished by harvesting regenerated energy from regenerative braking (described above), or by fuel cells stack 202. In this way, battery 212 can be discharged to contribute sustainable power to power module 150/propulsion system 154. It should be understood that battery 212 may also be recharged via plugin charging, e.g., via building mains, external charging unit, and so on.

Figure 3:
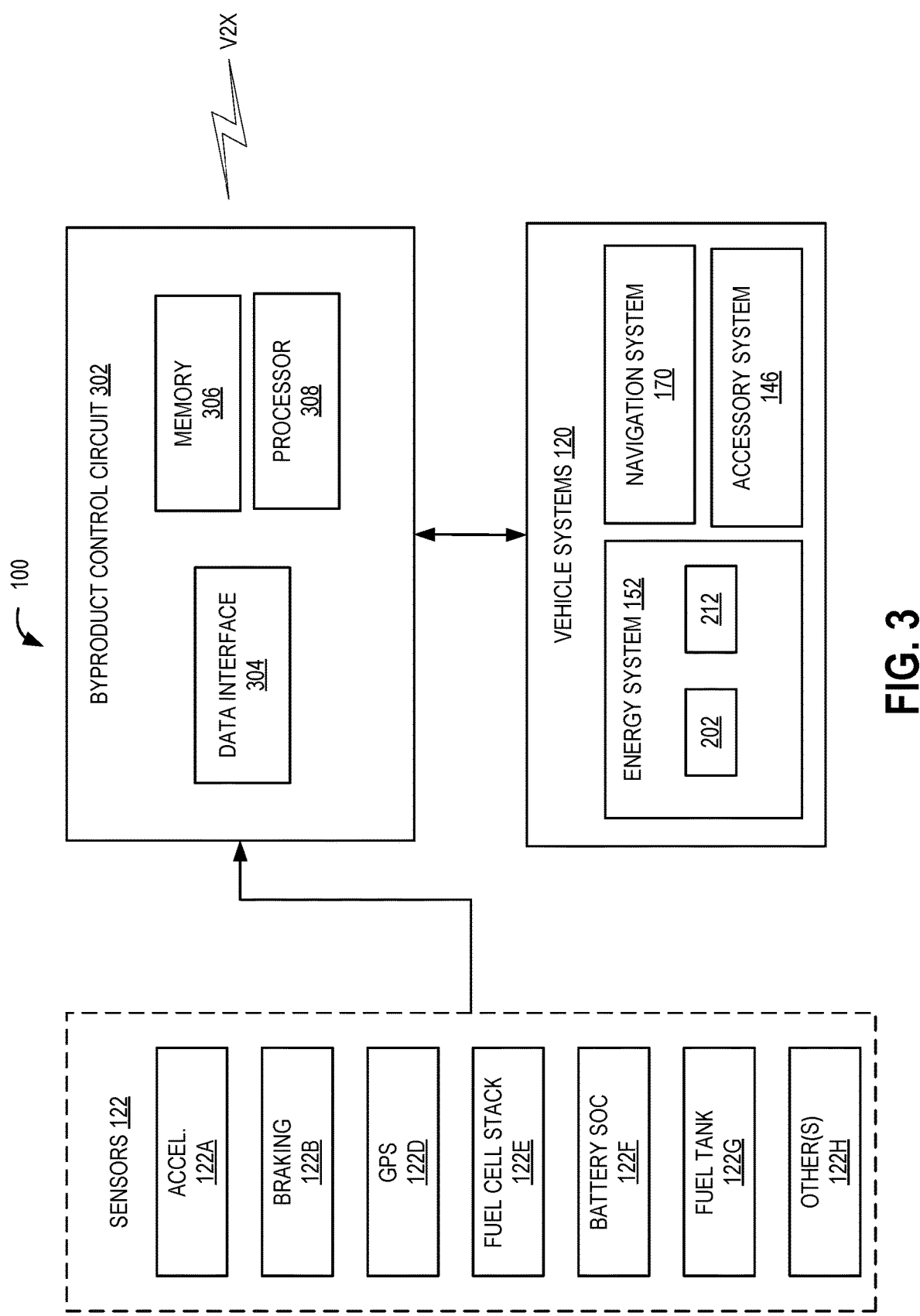
FIG. 3 is a schematic representation of a byproduct control system in accordance with one embodiment.

FIG. 3 illustrates an example architecture for operating/controlling an FCV 100 whereby excess nitrogen gas may be captured for later/subsequent use. As alluded to above, various sensors 122 may monitor/track/sense information regarding various operative characteristics of FCV 100. As illustrated in FIG. 3, such sensors may include, but are not necessarily limited to, e.g., a sensor to sense acceleration demand 122A, a sensor 122B to sense braking demand, a GPS receiver 122D to detect a current/future/past location or position (which in some embodiments can be translated into road grade information, for example), a sensor 122E to monitor operating state of the fuel cell stack, sensor 122F monitor battery SOC, e.g., battery 212, a sensor(s) to monitor the hydrogen fuel tank(s) 200B-200N, and other sensors 122H, which may be position sensors, accelerometers, imaging devices (cameras), etc.

That is, sensors 122 may monitor, measure, detect and/or otherwise obtain data regarding various inputs to the fuel cell stack 202, and various outputs, outcomes or operating states of the fuel cell stack 202/components comprising fuel cell stack 202. The various conditions of the fuel cell stack 202 include the gas pressure or the water pressure within the cathode/anode, the gas temperature or the water temperature within the cathode/anode, the mol flow rate of the gas or the water within the cathode/anode or the mol fraction of the gas or the water within the anode. Other conditions may include an overall amount of water in the fuel cell stack 202, and a flux or an amount of gas or water transfer between the anode and the cathode. The various gases may include hydrogen, nitrogen and/or oxygen. The various outputs of the fuel cell stack 202 include a voltage and/or a water balance crossover.

Sensor information from one or more of sensors 122 may be sent to and received by byproduct control circuit 302, which may be an embodiment of or a part of processor 124, global control module 128G, power control module 128P, or energy supersystem 130, or its own dedicated processor/processing system. As illustrated in FIG. 3, byproduct control circuit 302 may comprise a data interface 304, which may be an embodiment of a wireless/wired communications interface through which sensor signals can be received. Memory 306 and processor 308, as noted above, may respectively comprise any form of appropriate GPU, CPU, etc., and flash, RAM, EEPROM, etc.

Sensor data indicating, e.g., the battery SOC of battery 212, along with propulsion-related requests or demands via acceleration sensor 122A, etc. may be received by byproduct control circuit 302. Processor 308 may execute instructions stored in memory 306 to determine whether to enable the collection/storage of nitrogen depending on the operating conditions/conditions relevant to FCV operation gleaned by sensors 122. In some embodiments, nitrogen can be collected upon a determination that the battery SOC of battery 212 is 100% full/at capacity (or some other threshold capacity). As noted above, battery chemistry limits the amount of charge a battery may store. When the battery is full or at some threshold battery SOC/level of charge, typical vehicles or like systems resort to dissipating excess energy, e.g., energy generated by regenerative braking. That is, in typical vehicles, once a battery is full, or has reached its capacity threshold, the excess energy created through regenerative braking is shed through heat/use of service brakes. Accordingly, operating in a way such that opportunities for regenerative braking are not lost (and the use of the service brakes can be avoided, reducing wear and tear).

However, in accordance with some embodiments, instead of dissipating or otherwise shedding/wasting energy from regenerative braking, the energy can be used to compress the nitrogen gas byproduct into one or more of fuel tanks 200B-200N or dedicated nitrogen tank 201. Accordingly, battery SOC sensor 122F may send a battery SOC signal/data to data interface 304. Upon a determination by processor 308 of byproduct control circuit 302 that the received sensor signal/data suggests that battery 212 is at its threshold capacity, processor 308 may obtain/request (or analyze latest/cached sensor information or data from fuel tank sensor(s) 122G. It should be understood that in some embodiments, fuel tank(s) 200B-200N may be individually controlled (or controlled as two or more subsets of fuel tanks). That is, hydrogen fuel can discharged to hydrogen supply system 200A in a particular manner/order such that at least one of fuel tanks 200B-200N is depleted faster or prior to other ones of fuel tanks 200B-200N to provide a storage vessel for nitrogen gas byproduct. In some embodiments, individualized control of one or a set of fuel tanks, is not needed as a dedicated nitrogen tank 201 can be implemented for storing nitrogen gas.

In some embodiments, GPS sensor 122D or navigation system 150 (alone or in combination) may be used to determine a future or upcoming path or route to be traveled by vehicle 100. In some embodiments, vehicle 100 (and in particular, data interface 304) may receive data or information from one or more vehicle-to-infrastructure/vehicle/etc. (V2X)-enabled sources. Any or all of these data/information sources may provide information to vehicle 100 regarding upcoming travel and travel conditions that may impact operation of energy system 200 in a way that relates to the capture/storage of nitrogen gas byproduct from fuel cell stack 202.

For example, based on data/information from GPS sensor 122D, a determination regarding vehicle 100's current location may be made by byproduct control circuit 302. In some embodiments, navigation system 150 may determine, e.g., from GPS sensor 122D, where vehicle 100 is currently located. Based on specified travel route(s), a destination, e.g., specified via navigation system 150, processor 308 (executing a byproduct control algorithm(s) stored in memory 306), may determine that certain opportunities for regenerative braking exist, e.g., downhill grades, or that there are a lack of regenerative braking opportunities.

In response to such determinations, processor 308 may enable collection and storage of nitrogen gas when appropriate. For example, if opportunities for regenerative braking exist in some upcoming portion(s) of vehicle 100's route/path, processor 308 may execute byproduct control instructions on memory 306 to deplete the charge of battery 202 by using battery 202 to, e.g., compress nitrogen gas byproduct for storage in one or more of fuel tanks 200B-200N or dedicated nitrogen tank 201. In this way, nitrogen gas can be captured (rather than wastefully dissipated), and battery 212 can be depleted to some desired level so as to allow for battery 212 to be recharged via regenerative braking in the upcoming portion(s) of vehicle 100's route/path. In some embodiments, battery 212 can be depleted through use/actuation/enabling of one or more elements of accessory system 148, e.g., turning on the air conditioning system in conjunction with the capture/storage of nitrogen gas.

In some embodiments, the volume of gas currently in a fuel cell tank may be determined via data/information from fuel tank sensor 122G, and processor 308 may determine which of fuel tanks 200B-200N may be a candidate(s) for storing nitrogen gas. For example, each of fuel tanks 200B-200N may be associated with a fuel tank sensor, such as fuel tank sensor 122G. Processor 308 may determine which of the fuel tanks 200B-200N is the most depleted/void of gas, i.e., hydrogen gas, making that particular tank a good candidate for storing nitrogen gas. In some embodiments, the requisite volume of a fuel tank is sufficient to begin receiving the nitrogen gas byproduct from fuel cell stack 202/byproduct management system 232. In some embodiments, and upon identifying the least full fuel tank, processor 308 may instruct energy system 152 to provide hydrogen fuel to fuel cell stack 202 from this identified fuel tank to facilitate quicker depletion of hydrogen from that particular tank. In this way, the fuel tank can be purged of hydrogen gas (to some threshold level, recalling some fuel tanks may not be able to be completely purged of gas), and can receive nitrogen gas.

When the fuel tank becomes sufficiently full with nitrogen gas, its associated fuel tank sensor can inform byproduct control circuit 302, and processor 308 may cease capturing nitrogen gas. In other embodiments, upon reaching full nitrogen capacity for nitrogen tank 201, processor 308 may again determine which of fuel tanks 200B-200N may be a candidate for storing nitrogen, and processor 308 may route nitrogen from byproduct management system 232 to that particular fuel tank. In still other embodiments, one or more of fuel tanks 200B-200N may be filled with nitrogen gas first, and dedicated nitrogen tank 201 may be subsequently used to store nitrogen gas.

Figure 4:
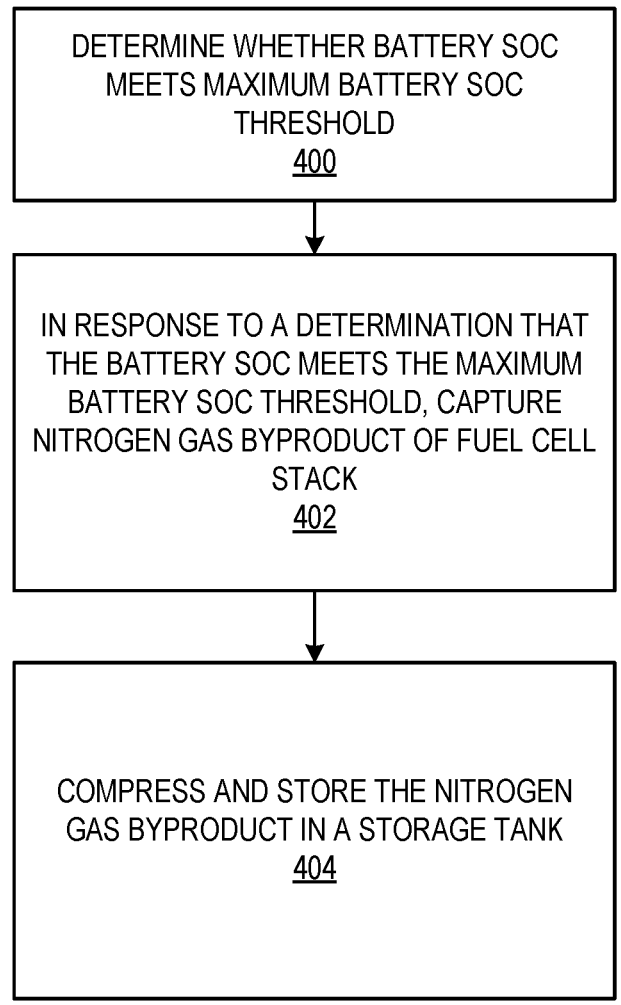
FIG. 4 is a flow chart illustrating operations that may be performed to effectuate nitrogen gas byproduct capture and storage in accordance with one embodiment.

It should be understood that the above-described scenarios and examples are not meant to be limiting. Various embodiments contemplate determining whether excess energy can be used to enable the capture and storage of nitrogen gas, a byproduct of fuel cell stack operation. FIG. 4 illustrates example operations that may be performed, e.g., by byproduct control circuit 302, to capture/storage nitrogen as a byproduct of fuel cell stack operation.

At operation 400, a determination is made regarding whether or not the battery SOC meets (or exceeds) the maximum battery SOC threshold associated with the battery. It should be understood that different batteries (due to differing chemical makeup) may have different operating thresholds/constraints, including the maximum battery SOC threshold. At it's maximum capacity, as noted above, the battery may not be able to store any more energy. Thus, any additional energy captured/created, e.g., through regenerative braking may need to be dissipated.

At operation 402, in response to a determination that the battery SOC at least meets the maximum battery SOC threshold, nitrogen gas byproduct of a fuel cell stack is captured. As described above, a byproduct management system, such as system 232 may be implemented in a vehicle (or other system) for ridding the vehicle/other system of byproducts from the fuel cell stack, including water, heat, or nitrogen. In the case of nitrogen, as explained above, the nitrogen gas byproduct from the fuel cell stack can be captured and stored in, e.g., a depleted hydrogen fuel tank, a dedicated nitrogen storage tank, or both.

At operation 408, the nitrogen gas byproduct is compressed and stored in a storage tank using energy/power from the battery. As explained above, an existing fuel tank (for traditionally storing hydrogen) may be depleted (either purposefully or through typical use) and used to store compressed nitrogen gas. In other embodiments, a dedicated nitrogen gas storage tank can be used. In still other embodiments, some combination of fuel and dedicated nitrogen tanks can be leveraged for the storage of nitrogen gas. In other words, energy that is generated, e.g. from regeneration, can, instead of being shed through mere heat or dissipated through the use of traditional brakes, be used to power/ provide power to energy system 200. For example, such energy may be used to control/actuate valves for isolating one or more hydrogen tanks 200B-N, propelling nitrogen gas to/from nitrogen tank 201, hydrogen tanks 200B-N, other disclosed components or aspects of energy system 200, compressing nitrogen gas in nitrogen tank 201/hydrogen tank 200B-N via pumps 203A/203B, etc. As illustrated in FIG. 2A, regenerated energy may be output from motor/MG 208 to byproduct management system. It should be understood that routing energy to aspects or components of energy system 200 may occur in a variety of ways, and not necessarily only through byproduct management system 232.

Figure 5:
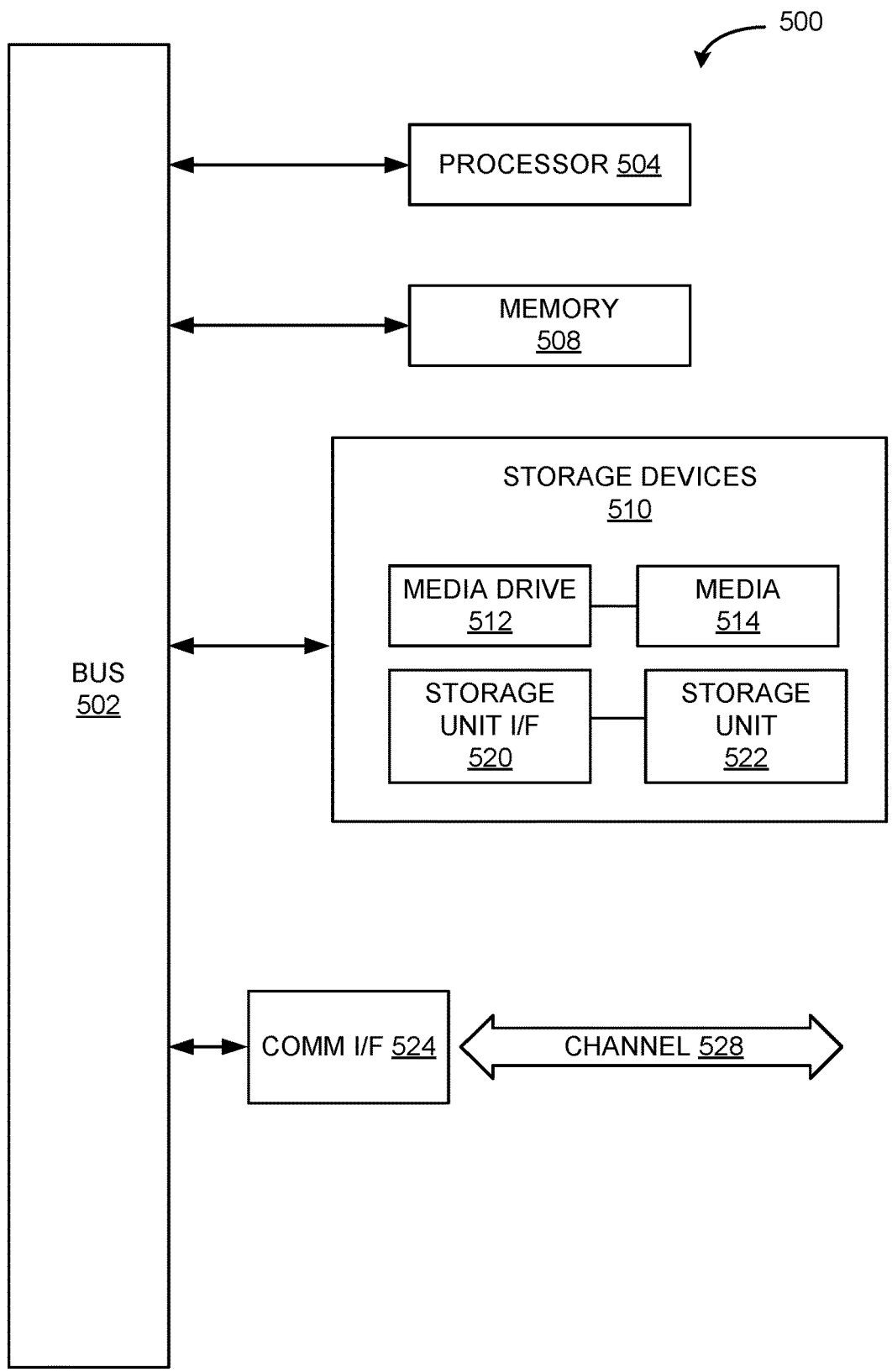
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504.

Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, R232S port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A fuel cell vehicle, comprising:
a processor; and
a memory unit operatively connected to the processor, the memory unit including computer code that when executed causes the processor to:
determine whether a battery's state of charge (SOC) meets a maximum battery SOC threshold;
in response to a determination that the battery SOC meets the maximum battery SOC threshold, capture nitrogen gas byproduct of a fuel cell stack of the fuel cell vehicle; and
compress and store the nitrogen gas byproduct in a storage tank using regenerated energy in excess of the maximum battery SOC threshold.

2. The fuel cell vehicle of claim 1, wherein the regenerated energy in excess of the maximum battery SOC threshold comprises energy generated through regenerative braking of the fuel cell vehicle.

3. The fuel cell vehicle of claim 1, further comprising a nitrogen storage tank in which the nitrogen gas byproduct is compressed and stored.

4. The fuel cell vehicle of claim 3, further comprising a first valve operatively implemented between the nitrogen storage tank and a byproduct management system, the first valve operating to isolate the nitrogen storage tank from nitrogen output from the fuel cell stack.

5. The fuel cell vehicle of claim 4, further comprising a second valve operatively implemented between the first valve and one or more hydrogen storage tanks, the second valve operating to isolate the one or more hydrogen storage tanks from nitrogen output from the fuel cell stack.

6. The fuel cell vehicle of claim 5, further comprising a plurality of additional valves operatively implemented between the second valve and the one or more hydrogen storage tanks.

7. The fuel cell vehicle of claim 6, wherein the byproduct management system controls at least one of the first and second valves to isolate the nitrogen storage tank from the one or more hydrogen storage tanks upon the compressing and storing of the nitrogen gas byproduct in the nitrogen storage tank reaching a maximum capacity of the nitrogen storage tank.

8. The fuel cell vehicle of claim 7, wherein the byproduct management system controls at least one of the one or more additional valves to isolate the first of the one or more hydrogen storage tanks from a hydrogen supply system of the fuel cell vehicle upon emptying of a first of the one or more hydrogen storage tanks of hydrogen.

9. The fuel cell vehicle of claim 8, wherein the byproduct management system controls at least one of the first, second, and one or more additional valves to direct additional nitrogen gas byproduct to the first of the one or more hydrogen storage tanks.

10. The fuel cell vehicle of claim 9, wherein the byproduct management system controls the at least an additional one of the one or more additional valves to isolate successive hydrogen storage tanks of the one or more hydrogen storage tanks from the hydrogen supply system upon emptying a previous hydrogen storage tank of the one or more hydrogen storage tanks.

11. The fuel cell vehicle of claim 10, wherein the byproduct management system controls the at least one of the first, second, and one or more additional valves to direct the additional nitrogen gas byproduct to the successively isolated hydrogen storage tanks.

12. A method, comprising:
   determining whether a battery's state of charge (SOC) meets a maximum battery SOC threshold;
   in response to a determination that the battery SOC meets the maximum battery SOC threshold, capturing nitrogen gas byproduct of a fuel cell stack of a fuel cell vehicle; and
   compressing and storing the nitrogen gas byproduct in a nitrogen-specific storage tank using regenerated energy in excess of the maximum battery SOC threshold.

13. The method of claim 12, wherein the regenerated energy in excess of the maximum battery SOC threshold comprises energy generated through regenerative braking of the fuel cell vehicle.

14. The method of claim 13, further comprising controlling a set of valves to isolate the nitrogen-specific storage tank from the fuel cell outputting the nitrogen gas byproduct and from one or more hydrogen storage tanks providing hydrogen to a hydrogen supply system of the fuel cell stack upon reaching a maximum capacity of the nitrogen-specific storage tank.

15. The method of claim 14, further comprising filling and isolating from the hydrogen supply system, successive ones of the one or more hydrogen tanks through controlling one or more of the set of valves.

* * * * *